July 7, 1925. 1,545,080

G. J. COOKE

SEAL FOR ROTATING SHAFTS

Filed Feb. 24, 1923

Inventor
George J. Cooke
By Cheever & Cox
Attys.

Patented July 7, 1925.

1,545,080

UNITED STATES PATENT OFFICE.

GEORGE J. COOKE, OF CHICAGO, ILLINOIS.

SEAL FOR ROTATING SHAFTS.

Application filed February 24, 1923. Serial No. 620,922.

*To all whom it may concern:*

Be it known that I, GEORGE J. COOKE, a citizen of the United States, residing at Chicago in the county of Cook and State of Illinois, have invented a certain new and useful Improvement in Seals for Rotating Shafts, of which the following is a specification.

This invention is a device for solving the ancient problem of preventing the escaping of compressed air or gas located on the interior of a machine past a rotating shaft located partly inside and partly outside of the machine, for instance, as in ice machines, where the escape of ammonia contained within the machine is not only wasteful but interferes with the functioning of the machine.

The invention consists in a comparatively simple seal or packing ring device capable of attaining the foregoing object, the same being easily manufactured and applied and very satisfactory in use. More particularly, the invention consists in numerous features and details of construction which will be hereafter more fully set forth in the specification and claims.

Referring to the drawings in which like numerals designate the same parts throughout the several views.

Figure 1:
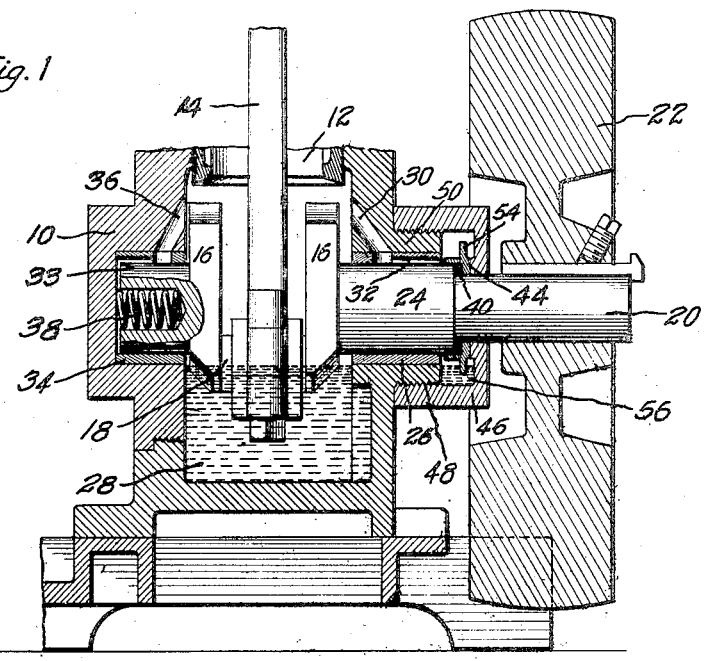
Figure 1 is a central elevation, largely in section, through an ice machine or engine having a crank shaft to which the mechanism of this invention is applied.

The seal ring is shown in use in Figure 1 in connection with the crank case 10 of a conventional refrigerating machine or engine having the cylinder 12 and crank rod 14, crank arms 16, crank pin 18 operating in connection with a shaft 20, extending outside the case and there carrying the fly wheel 22. This shaft 20 is conventionally provided with an enlarged shoulder 24 immediately adjacent to crank arm 16 which takes bearing in a conventional bushing 26 mounted in the right hand side of the crank case as shown in Figure 1. The exterior of bearing shoulder 24 and interior bushing 26 are freely lubricated with oil 28 splashed up the interior of the case 10 in a conventional manner and thence flowing down oil passage 30 to an oil duct 32 in the bushing 26.

The opposite or lefthand crank arm 16 as shown in Figure 1 carries a stub shaft 33 journaled in a bushing 34 similarly lubricated through a duct 36, leading to the interior of the crank case 10. This stub shaft 33 is hollow for the reception of a compression spring 38, intended to force the entire shaft mechanism to the right against washer 40 of compressible material retained by and pressing against metallic ring 42 of this invention, having a flat bearing surface 44 engaging the interior of a cap 46 detachably secured by any suitable means as, for instance, screw threads 48, to the adjacent hub 50 of crank case 10. The desired result for this invention is obtained by providing on the side of ring 42 which is opposite to bearing surface 44 and adjacent to the hub 50 an annular circumferential flange 52 of greater internal diameter than the shouldered bearing member 24 of shaft 28, and of sufficient width so that it slightly encloses the right hand end of said member 24, as shown in Figure 1,—this with the result that the pressure of spring 38 forces the shouldered member 24 against the compressible washer 40 with sufficient force so that it spreads in between the flange and the circumference of shoulder member 24 and thus locks the ring 42 to the end of the shoulder member, thus effectively preventing all passage of gas contained in crank case 10 between the shaft and the ring 42 or any part thereof. Before this locking effect actually takes places, the ring obviously so adjusts itself that the bearing surface between the bearing face 44 and the interior of the cap 46 is a perfect ground joint with the result that no oil or gas can escape at that point. There being thus only one rotating surface, i. e. surface 44, instead of two as in prior devices, the opportunity for leakage is reduced by one-half.

To insure more perfect sealing, the ring 42 is provided with a plurality of radially projecting arms or teeth 54 which dip into oil 56 enclosed within crank 46 and immediately below the ring as clearly shown in Figure 1.

The result of this construction is that the ring 42, being practically locked to the shaft by the washer 40, these teeth 44 constantly dip into the oil portion 56 and carry some of it up and over the top of shaft 20 in the side of cap 46 with the result that all exterior portions of the ring are thoroughly lubricated and sealed with oil against the passage of gas under pressure contained within crank case 10.

Figure 2:
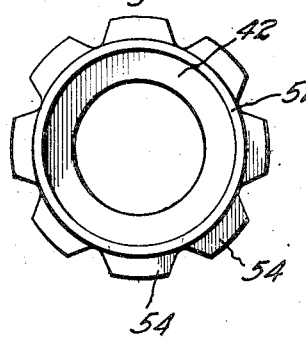
Figure 2 is a face and Figure 3 a side view of a metal ring illustrating this invention in its preferred form.
Figure 3:
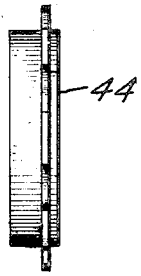
Figure 4:
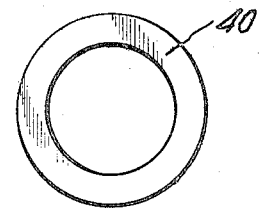
Figure 4 shows a washer used in connection with the parts of Figures 1 and 2.
Figure 5:
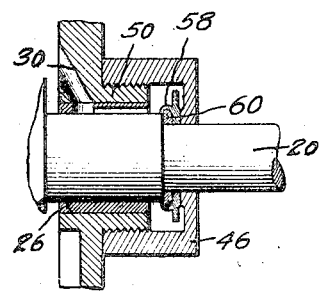
Figure 5 shows a modified form of the ring in operative position in connection with a machine shaft.

The alternative construction of Figure 5 differs from that of Figure 1 only in that a curved flange 58 is provided in place of flange 52 of Figure 2 to initially grip the washer 60, taking the place of washer 40, and hold it in place within the ring even when the engine is disassembled and the ring and washer removed from the rest of the device.

Obviously, the resiliency of washer 40 or 60 allows the parts to adjust themselves so that bearing surface 44 is perfect even though some wear takes place in any of the parts. The fit of the flange 52 on shaft shoulder 24 is close enough so that in no event can the washer be squeezed out of the recess in ring 42.

Having thus described my invention, what I claim as new and desire to secure by Letters Patent is:

1. The combination with a rotatable shaft and a wall through which it extends; of a ring surrounding the shaft, rotatable therewith and bearing against said wall, means acting to move said shaft to force the ring in contact with said wall, and a yieldable connection between the ring and shaft whereby the ring may adjust itself to a running fit against said wall.

2. In mechanism of the class described, in combination with a rotatable shaft having a shoulder thereon, a metallic seal ring on the shaft adjacent to the shoulder having a circumferential flange of greater diameter than the shoulder and overlapping it, and a compressible washer inside said flange adapted to be compressed by the shoulder on the shaft so tightly inside the flange as to frictionally fasten the ring to the shaft.

3. In mechanism of the class described, in combination with a rotatable shaft having a shoulder thereon, a metallic seal ring on the shaft adjacent to the shoulder having a circumferential flange of greater diameter than the shoulder and overlapping it, a compressible washer inside said flange adapted to be compressed by the shoulder on the shaft so tightly inside the flange as to frictionally fasten the ring to the shaft, and a flat bearing surface on the side of the ring opposite said flange.

4. In mechanism of the class described, in combination with a rotatable shaft having a shoulder thereon, a metallic seal ring on the shaft adjacent to the shoulder having a circumferential flange of greater diameter than the shoulder and overlapping it, a compressible washer inside said flange adapted to be compressed by the shoulder on the shaft so tightly inside the flange as to frictionally fasten the ring to the shaft, and oil collecting projections on the outer circumference of the ring for the purposes set forth.

5. In mechanism of the class described, in combination with a rotatable shaft having a shoulder thereon, a metallic seal ring on the shaft adjacent to the shoulder having a circumferential flange of greater diameter than the shoulder and overlapping it, a compressible washer inside said flange adapted to be compressed by the shoulder on the shaft so tightly inside the flange as to frictionally fasten the ring to the shaft, a flat bearing surface on the side of the ring opposite said flange, and oil collecting projections on the outer circumference of the ring for the purposes set forth.

6. The combination with a rotatable shaft, a wall through which it extends, and an oil reservoir below the same; of a member surrounding the shaft in running contact with said wall, packing material between the member and shaft, sealing against the shaft and fastening the member thereto, and a flange on the member dipping into said reservoir so as to elevate oil therefrom onto said shaft.

In witness whereof, I have hereunto subscribed my name.

GEORGE J. COOKE.